United States Patent [19]

Kahlen

[11] Patent Number: 5,683,727
[45] Date of Patent: Nov. 4, 1997

[54] APPARATUS FOR THE PRODUCTION OF BLOWN FOILS OR FILMS OF THERMOPLASTIC

[75] Inventor: Wilhelm Kahlen, Troisdorf, Germany

[73] Assignee: Reifenhauser GmbH & Co. Maschinenfabrik, Troisdorf, Germany

[21] Appl. No.: 518,185

[22] Filed: Aug. 23, 1995

[30] Foreign Application Priority Data

Sep. 13, 1994 [DE] Germany ............... 44 32 513.4

[51] Int. Cl.[6] ............................................. B29C 55/28
[52] U.S. Cl. ................. 425/72.1; 425/141; 425/326.1; 264/40.6
[58] Field of Search ....................... 425/72.1, 141, 425/143, 326.1; 264/90.6

[56] References Cited

U.S. PATENT DOCUMENTS

| | | | |
|---|---|---|---|
| 4,022,558 | 5/1977 | Herrington | 425/72.1 |
| 4,606,879 | 8/1986 | Cerisano | 425/326.1 |
| 5,288,219 | 2/1994 | Smith | 425/143 |
| 5,318,427 | 6/1994 | Voss | 425/72.1 |
| 5,354,190 | 10/1994 | Hofer et al. | 425/72.1 |
| 5,464,336 | 11/1995 | Planeta | 425/72.1 |

FOREIGN PATENT DOCUMENTS

| | | | |
|---|---|---|---|
| 479754 | 3/1973 | Japan | 425/72.1 |
| 90/15707 | 12/1990 | WIPO . | |

*Primary Examiner*—Jay H. Woo
*Assistant Examiner*—Iurie A. Schwartz
*Attorney, Agent, or Firm*—Herbert Dubno

[57] ABSTRACT

A foil-blowing apparatus has its external cooling nozzles vertically and/or radially adjustable relative to the transition region between the neck of the thermoplastic tube and the blown foil balloon to enable thickness errors to be eliminated.

12 Claims, 4 Drawing Sheets

APPARATUS FOR THE PRODUCTION OF BLOWN FOILS OR FILMS OF THERMOPLASTIC

FIELD OF THE INVENTION

My present invention relates to an apparatus for film or foil blowing of thermoplastic synthetic resin.

BACKGROUND OF THE INVENTION

A film or foil-blowing apparatus for the production of film from thermoplastic synthetic resin generally comprises a blowing head from which an annular strand of thermoplastic synthetic resin in a plastified state is extruded and which is provided with a source of blowing air for expanding that strand into a foil balloon which is closed at its upper end remote from the head by being flattened between a pair of rollers. The expansion of the thermoplastic synthetic resin strand reduces its thickness to film or foil thickness.

The apparatus can also include a calibration basket which defines the diameter of the balloon, the flattening system for closing the end of the balloon and flattening the tubular film into a pair of superposed layers, an external cooling system having a multiplicity of cooling air nozzles trained on the expanding balloon and a system for monitoring the thickness of the film which is produced and which can control the balloon or the extrusion rate or both.

As the balloon expands, the tubular thermoplastic strand has a transition region from a neck to the full width or diameter of the balloon which terminates at the frost line, i.e. the plane through the balloon at which solidification or congealing is substantially complete so that further external cooling above this plane is not essential and the balloon itself is stable, i.e. the thermoplastic of the balloon is no longer flowable.

This transition region can be considered to be shell shaped, i.e. to have the configuration of a shape of revolution with regions which can be hemispherical or partly spherical and other regions which are transitions from the partly spherical region to the neck and from the partly spherical region to the cylindrical shape of the balloon at the calibration basket.

The control device or devices may be operated in accordance with conventional laws of control technology. For example, a device can be provided for measuring the thickness of the blown foil along the circumference of the balloon or transverse to the direction of feed of the foil and across the webs of the flattened foil or the like. Foil thickness errors can thus be detected and control responses generated.

The thickness measurement can be effected macroscopically, i.e. by measuring the growth of a coil on which the foil is wound up and errors which lead to bulges of the coil, i.e. barrel-shaped formations, can be locally eliminated around the periphery of the balloon or spread out around the periphery so that successive zones of greater thickness will not deposit on one another in the winding of the coil.

The thickness measurements can be effected locally all around the periphery as well and individual control for each of a number of zones around the periphery of the balloon can be effected. Generally speaking a controller can have a computer which compares a measured thickness value (whether obtained locally or macroscopically) with a set point value to determine an error and means responsive to the error signal for controlling the local thickness.

In WO 90/15 707, an external cooling system is provided on the blowing head which directs air against the balloon at its neck immediately after emergence of the thermoplastic tube from the annular gap of the head.

In this system, a nonadjustable cooling ring is provided directly on the blowing head and has a circumferential slit from which the main portion of the cooling air emerges in as uniform a pattern as possible.

On this cooling ring a second cooling ring is mounted whose annular outlet is subdivided into segments forming individual cooling air nozzles. The cooling air flow through these nozzles is controllable.

This apparatus is of expensive construction, has been found to be difficult and expensive to control and has also been found to be less than fully reliable since the responsiveness is low. This appears to be because the thickness of the foil balloon does not respond as rapidly to changes in the cooling air flow as is desirable. Indeed this appears to be the problem with other systems in which individual nozzles are provided around the periphery of the foil balloon for controlling foil thickness and eliminating deviations in foil thickness in other conventional systems.

OBJECTS OF THE INVENTION

It is the principal object of the present invention to provide an improved foil or film-blowing apparatus whereby the drawbacks of these earlier systems are avoided.

More specifically, it is an object of this invention to provide a foil-blowing apparatus which can more precisely eliminate deviations in foil thickness and, indeed, can do so with greater control responsiveness.

Still another object of this invention is to provide a low-cost and reliable system for eliminating thickness defects in foil-blowing apparatus.

SUMMARY OF THE INVENTION

These objects and others which will become apparent hereinafter are attained, in accordance with the invention in an apparatus of the type described, i.e. having a foil-blowing head, calibration cage, foil-flattening unit closing the balloon, and external cooling nozzles in the region between the outlet from the foil-blowing head and the frost line, wherein the external cooling system comprises at least one crown of cooling air nozzles provided in shell-forming transition regions between the neck and the balloon below the frost line, the cooling nozzles of this crown being vertically and/or radially adjustable.

preferably, the cooling air nozzle crown is subdivided into crown segments which are adjustable independently from one another and wherein each crown segment has at least one cooling air nozzle. The cooling air nozzles can, for simplicity and reliability, be provided with spindles and servomotors which constitute effectors of the control system, i.e. the effectors have radially or axially adjusting nozzles. These nozzles have highly exact adjustment and positioning of the nozzles and precise control of the thickness at the zones of the respective nozzles.

The invention ensures in a relatively simple manner a very precise control of foil thickness and hence elimination of foil thickness errors by regulating the contact of cooling air with respective zones of the foil without, however, the drawbacks encountered with flow volume control. Flow volume control can, however, be used in addition if desired. The foil balloon is largely formed in this transition region and has, therefore, a substantial circumference and, consequently, a large area which is influenced by the cooling air from the respective nozzles.

It is surprising, therefore, that by adjustment of the positions of the nozzles in the vertical and radial direction, control of the thickness is possible with greater sensitivity than with flow control alone, even when the nozzles are disposed in the region of the frost line. Of course, above the frost line, cooling control no longer has any significant effect on the foil thickness.

Advantageously the cooling air nozzles are wide-gap nozzles from which the cooling air jets emerge in a flat widening configuration, i.e. the air fans out toward the foil balloon. Neighboring fans of the cooling air can intersect or overlap and in the region of these overlaps there can be cooling reinforcement.

The cool air nozzles can have relatively small gap widths, e.g. of about 2 mm. The pressure with which the cooling air is supplied to the nozzles will depend upon the spacing of the nozzle from the transition region of the foil balloon and should be sufficient so that the fanning-out jets completely surround the transition region.

The nozzles should be segments which are equidistant from one another and advantageously the nozzles may be equidistant from the portions of the transition region with which they are juxtaposed.

According to still another feature of the invention, the cooling air nozzles, nozzle crown, crown segment, etc. are mounted on the calibration basket in the region of a lower edge of the latter. When the nozzles are directly mounted on the calibration basket, they form the nozzle crown.

The control techniques used can vary. In all cases, the nozzles of the nozzle crown are to be adjustable in the vertical and/or radial direction. In addition, the flow rates of the cooling air to the individual nozzles can be controlled. In a preferred embodiment of the invention the elimination of foil thickness errors can be effected exclusively by adjustment of the cooling air nozzles in the vertical and/or radial direction.

The apparatus can be designed as a long-neck foil-blowing system (see German patent document 44 18 133) or as a short-neck foil-blowing system.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
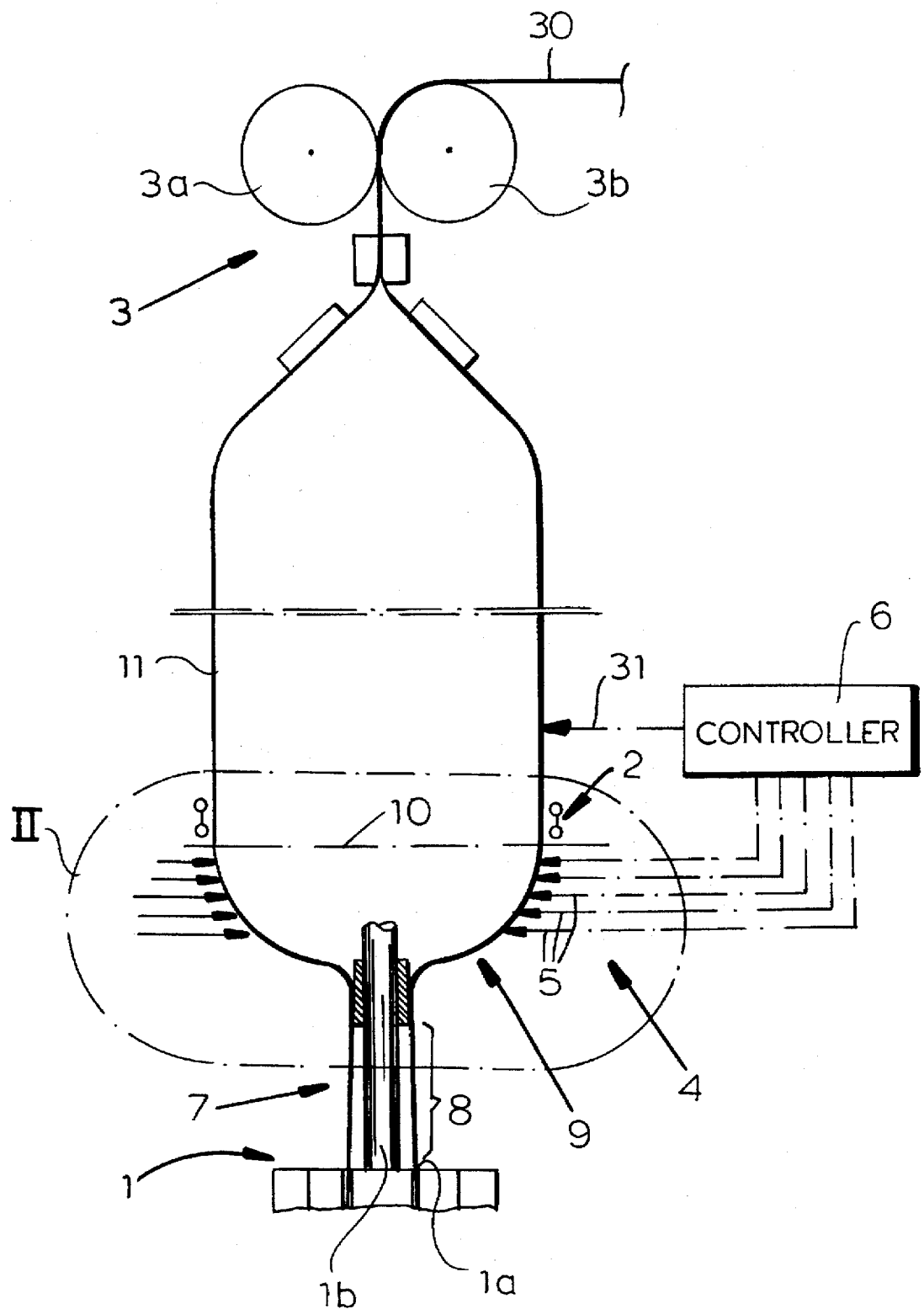
FIG. 1 is a diagrammatic elevational view of an apparatus according to the invention.

As can be seen in FIG. 1, the foil-blowing apparatus of the invention utilizes a thermoplastic synthetic resin for blowing a foil which is compacted by the two rolls 3a and 3b of a flattening device into a double-layer web 30 which can be coiled on a roll.

The apparatus can comprise a blowing head 1 at the end of an extruder from an annular orifice 1a of which a thermoplastified synthetic resin tube 7 can emerge. In this apparatus, in which the head is configured as a long-neck blowing head, the synthetic resin tube 7 has a long-neck region 8. The tube 1b of the head 1 serves to introduce blowing air into the balloon and to withdraw the heated blowing air therefrom.

Figure 2:
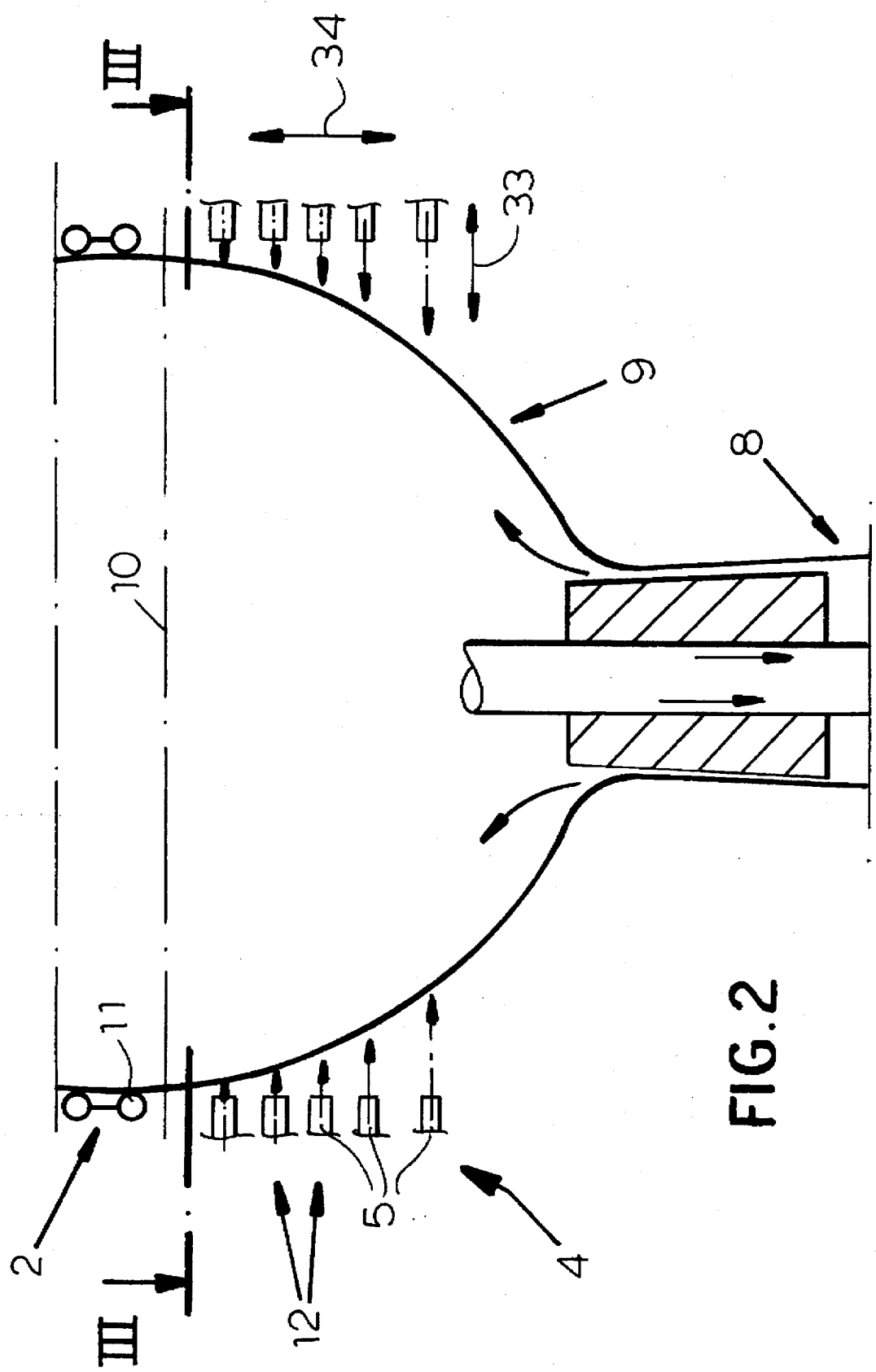
FIG. 2 is a detail in section of the region II of FIG. 1.

The apparatus also comprises a calibrating basket 2 which surrounds the foil balloon 11 above the frost line 10. Below the basket 2 an external cooling system 4 is provided with a multiplicity of cooling nozzles forming part of a control system having a controller 6 which is responsive to the foil thickness as represented at 31. Above the neck region 8 and below the frost line 10 the synthetic resin tube 7 is expanded with progressive thinning in a shell-shaped transition region 9. As can be seen especially from FIGS. 2 and 3, the external cooling system 4 can comprise a cooling air nozzle crown 12 which is disposed around the transition region 9 between the neck 8 and the foil balloon 11, below the frost line 10. The nozzles 5 of the crown 12 are vertically and/or radially adjustable as represented by the double-headed arrows 33 and 34 in FIGS. 2 and 3.

In the embodiment illustrated, the cooling nozzle crown 12 is subdivided into crown segments 13 which are adjustable independently from one another with each segment 13 having at least one cooling nozzle 5. As will be described in connection with FIG. 4, the nozzles 5 can be adjusted by spindles and servomotors which form the effectors of the control system.

Figure 3:
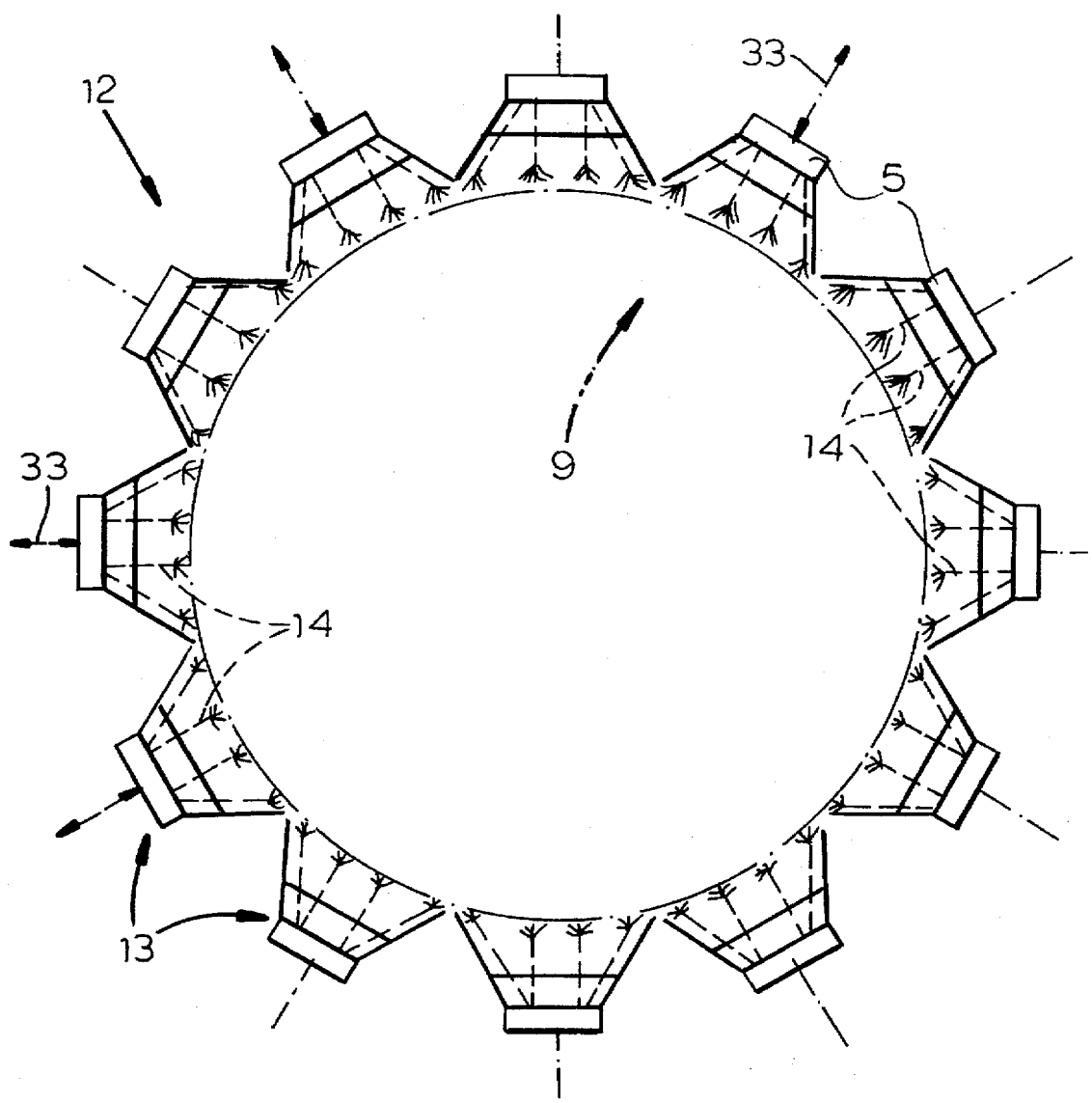
FIG. 3 is a section taken along the line III—III of FIG. 2.

In the embodiment illustrated and as is preferred, the nozzles 5 are wide-gap nozzles which discharge, as can be seen from FIG. 3, fan-shaped jets toward the transition region 9 with the jets overlapping at the transition region. The nozzles may have a slot width of about 2 mm.

Figure 4:
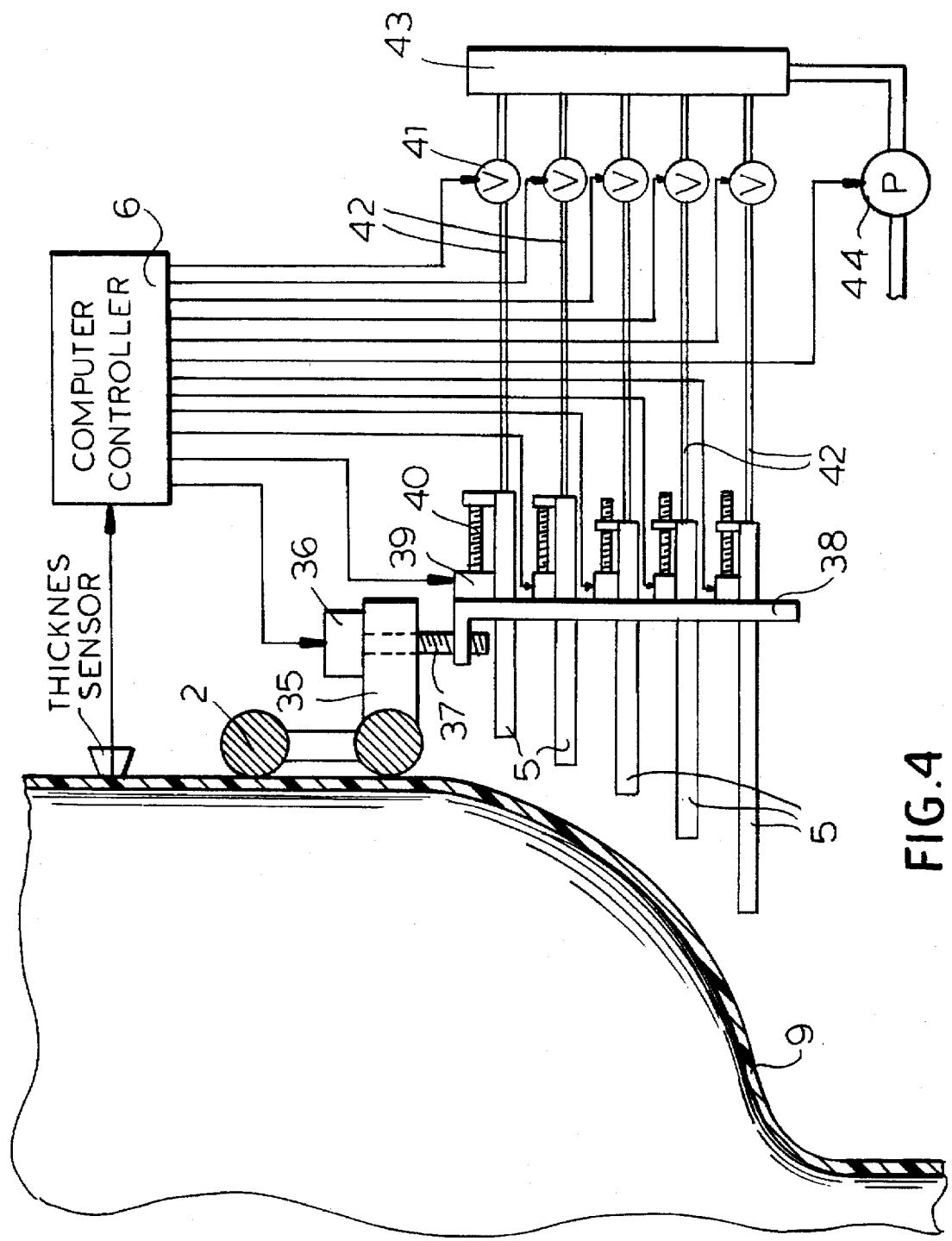
FIG. 4 is another detail illustrating principles of the invention.

The crown 12 or the segments 13 of the crown 12 or the nozzles 5 directly, can be fastened to the lower edge of the basket as will also be apparent from FIG. 4.

The elimination of the thickness defects can be effected exclusively by adjusting the vertical and/or radial positions of the nozzles or by additionally controlling the cooling air flow.

As has been shown in FIG. 1, the apparatus is particularly advantageous with long-neck foil-blowing processes. The nozzles can be changed to vary the flow rate if desired.

As can be seen from FIG. 4, a bracket 35 can be provided at the bottom edge of the calibration basket 2 and can carry one of the servomotors 36 whose spindle 37 displaces a holder 38 for a number of nozzles 5. Each of these nozzles 5 may be driven in turn by a motor 39 and a spindle 40 under the control of a computer controller 6 which can also control the valves 41 feeding the nozzles 5 via the hoses 42. A manifold 43 connected to a blower 44 can supply the cooling air.

In this embodiment, a number of such holders 38 defining respective nozzle segments can be spaced around the transition region 9 of the expanding thermoplastic tube and all of the nozzles can be individually controlled. In this system all of the nozzles of one segment can be vertically displaced together but are individually radially displaceable. None the less, the individual nozzles can be vertically displaceable on a common holder 38.

I claim:

1. A foil-blowing apparatus for a thermoplastic synthetic resin material, said apparatus comprising:

a blowing head formed with an annular orifice issuing a tube of thermoplastic synthetic resin material and blowing same to form a substantially vertical foil balloon from said material extending from a neck and having a transition region between said neck and said balloon, said transition region terminating at a frost line of the balloon;

a calibration basket surrounding said foil balloon above said frost line;

flattening means vertically spaced from said head for closing said balloon and flattening foil thereof into a coilable web;

external cooling means in said transition region and comprising at least one cooling nozzle crown surrounding said transition region and formed with nozzles training jets of cooling air against said transition region; and means for eliminating foil thickness errors and including means for detecting thickness of the blown foil and means responsive to the detected thickness for adjusting positions of said nozzles in at least one of the vertical direction and the radial direction relative to said transition region in response to the detected thickness, the cooling nozzle crown being subdivided into nozzle segments which are adjustable independently from one another by said means for adjusting, each of said nozzle segments being provided with at least one of said nozzles.

2. The apparatus defined in claim 1 wherein the means for adjusting positions of said nozzles in at least one of the vertical direction and the radial direction relative to said transition region in response to the detected thickness includes a spindle and a servomotor for driving the respective spindle and forming a control-system effector.

3. The apparatus defined in claim 2 wherein the nozzles are each nozzles from which respective air jets fan out toward said transition region.

4. The apparatus defined in claim 3 wherein the nozzles are connected to said basket at a lower edge thereof.

5. The apparatus defined in claim 4 wherein said means for controlling positions of said nozzles further comprises means for controlling air flow rate through said nozzles.

6. The apparatus defined in claim 4 wherein the elimination of said foil thickness errors is effected solely by adjusting positions of said nozzles in at least one of the vertical direction and the radial direction.

7. The apparatus defined in claim 4 wherein said head is a long-neck foiling blowing head.

8. The apparatus defined in claim 1 wherein the nozzles are each nozzles from which respective air jets fan out toward said transition region.

9. The apparatus defined in claim 1 wherein the nozzles are connected to said basket at a lower edge thereof.

10. The apparatus defined in claim 1 wherein said means for controlling positions of said nozzles further comprises means for controlling air flow rate through said nozzles.

11. The apparatus defined in claim 1 wherein the elimination of said foil thickness errors is effected solely by adjusting positions of said nozzles in at least one of the vertical direction and the radial direction.

12. The apparatus defined in claim 1 wherein said head is a long-neck foiling blowing head.

* * * * *